US006851207B2

(12) United States Patent
Yoshimatsu

(10) Patent No.: US 6,851,207 B2
(45) Date of Patent: Feb. 8, 2005

(54) CONSTRUCTION MACHINERY

(75) Inventor: Hideaki Yoshimatsu, Hyogo (JP)

(73) Assignee: Kobelco Construction Machinery Co., Ltd., Hiroshima (JP)

( * ) Notice: Subject to any disclaimer, the term of this patent is extended or adjusted under 35 U.S.C. 154(b) by 65 days.

(21) Appl. No.: 10/276,304

(22) PCT Filed: May 16, 2001

(86) PCT No.: PCT/JP01/04076

§ 371 (c)(1),
(2), (4) Date: Nov. 22, 2002

(87) PCT Pub. No.: WO01/90490

PCT Pub. Date: Nov. 29, 2001

(65) Prior Publication Data

US 2003/0132729 A1 Jul. 17, 2003

(30) Foreign Application Priority Data

May 23, 2000 (JP) ....................................... 2000-151423
Sep. 29, 2000 (JP) ....................................... 2000-299499

(51) Int. Cl.$^{7}$ ............................ G05D 5/02; F16D 31/02

(52) U.S. Cl. ............................. 37/348; 37/414; 60/431; 60/420; 703/50

(58) Field of Search .......................... 37/348, 347, 410, 37/414, 466; 60/431, 420, 400; 703/50

(56) References Cited

U.S. PATENT DOCUMENTS

| | | | | | |
|---|---|---|---|---|---|
| 3,747,351 | A | * | 7/1973 | Wilkerson et al. | 60/476 |
| 4,697,418 | A | * | 10/1987 | Okabe et al. | 60/434 |
| 5,629,849 | A | * | 5/1997 | Ahn | 701/50 |
| 5,778,671 | A | * | 7/1998 | Bloomquist et al. | 60/456 |
| 6,078,855 | A | * | 6/2000 | Kinugawa et al. | 701/50 |
| 6,220,028 | B1 | * | 4/2001 | Ishikawa et al. | 60/431 |
| 6,651,428 | B2 | * | 11/2003 | Takahashi et al. | 60/447 |
| 6,666,022 | B1 | * | 12/2003 | Yoshimatsu et al. | 60/413 |
| 2003/0226291 | A1 | * | 12/2003 | Naruse et al. | 37/348 |

FOREIGN PATENT DOCUMENTS

| | | | |
|---|---|---|---|
| EP | 814206 | | 12/1997 |
| EP | 962597 | | 12/1999 |
| EP | 1291467 | * | 12/2003 |
| JP | 8-93707 | | 4/1996 |
| JP | 11-81388 | | 3/1999 |
| JP | 11-336703 | * | 12/1999 |
| JP | 2000-9101 | * | 1/2000 |
| JP | 2000-289078 | * | 10/2000 |
| JP | 2001-3398 | | 1/2001 |

* cited by examiner

*Primary Examiner*—Thomas B. Will
*Assistant Examiner*—Thomas A. Beach
(74) *Attorney, Agent, or Firm*—Oblon, Spivak, McClelland, Maier & Neustadt, P.C.

(57) ABSTRACT

First and second hydraulic pumps each adapted to operate plural actuators are activated by separate electric motors respectively. In accordance with signals provided from a controller on the basis of operations of levers, the number of revolutions of the electric motor and that of the electric motor are controlled each independently and simultaneously to control the discharge rates of both hydraulic pumps.

18 Claims, 13 Drawing Sheets

CONSTRUCTION MACHINERY

FIELD OF ART

The present invention relates to a construction machine (e.g., a hydraulic excavator or a crane) wherein hydraulic pumps are activated by electric motors to operate hydraulic actuators.

BACKGROUND ART

The prior art will be described below with respect to a hydraulic excavator for example.

According to the construction of a conventional hydraulic excavator, an upper rotating body is mounted rotatably on a lower traveling body, an excavating attachment comprising a boom, an arm, and a bucket is attached to the upper rotating body, and hydraulic oil discharged from pumps is fed to hydraulic actuators to effect booming, arming, bucketing, traveling, and rotating operations.

According to the construction of the conventional hydraulic excavator, however, the pumps are activated by an engine and pressure oil discharged from the pumps is fed to hydraulic actuators through control valves. Thus, a surplus flow in each pump is throttled and discarded into a tank through a control valve or a relief valve, thereby controlling the flow rate in the actuator concerned. With this construction, not only there arises a great loss of energy but also there arise problems related to environmental pollution such as the generation of noise and exhaust gas.

In view of this point there recently has been proposed what is called a hybrid type excavator wherein a generator is driven by an engine to rotate an electric motor and hydraulic pumps are rotated by the electric motor.

This hybrid type is advantageous in that the pump discharge rate (flow rate of oil fed to each actuator) can be controlled by controlling the number of revolutions of the electric motor and that therefore the loss of energy is basically small in comparison with the conventional pure hydraulic type.

However, since the proposed technique adopts the construction wherein plural hydraulic pumps are activated by one electric motor, the pumps are always equal in the number of revolutions despite of different quantities of oil to be discharged from them. Consequently, even a pump which is required to discharge only a small amount of oil comes to rotate at high speed following the rotation of the other pumps. Thus, the pump efficiency is low and the loss of energy increases because a surplus flow in each pump is discarded to the tank through a valve.

The following problems are also involved in the proposed technique.

1. During excavation there is performed, in many cases, a composite operation comprising an excavating operation using both arm and bucket and a boom raising or lowering operation which is conducted simultaneously with the excavating operation. At this time, both arm and bucket cylinders for performing a main excavating operation become high in pressure relatively, whereas a boom cylinder for raising and lowering the attachment does not become so high in pressure as both arm and bucket cylinders because of a great influence of the own weight of the attachment.

In this case, according to the prior art, since both boom cylinder and bucket cylinder are actuated by the same pump, it is required that the pressure of oil discharged from the pump, when increased up to the pressure of the bucket cylinder, be lowered with a control valve and then fed to the boom cylinder, thus causing a pressure (energy) loss.

2. Since there is adopted a construction wherein all of the boom, arm and bucket cylinders are controlled their operating speeds by a control valve opening control (open circuit control), a large gravity based on the weight of the attachment acting on those attachment components cannot be regenerated as power when brake a large gravity. Particularly, a large gravity acts on the boom which undergoes the action of the entire weight of the working attachment, but it is impossible to regenerate power during descent of the boom and thus also in this point there arises the waste of energy.

It may be proposed to adopt a construction wherein operating direction and speed are controlled by controlling the rotational direction and speed of an electric motor without using the control valve for each attachment cylinder. With this construction, however, the response characteristic at the time of switching extension and contraction of each cylinder from one to the other becomes deteriorated, so that it becomes impossible to effect works (mud removing work and earth and sand scattering work) which require a minute extension/contraction switching operation particularly for both arm and bucket cylinders.

In view of the above-mentioned problems, according to the present invention there is provided a construction machine of a hybrid type including electric motors to activate hydraulic pumps, which construction machine can eliminate a wasteful operation of the pumps and thereby attain the saving of energy.

According to the present invention there also is provided a construction machine of the above hybrid type, capable of ensuring a required response characteristic while suppressing the loss of energy.

DISCLOSURE OF THE INVENTION

For solving the foregoing problems the present invention adopts the following constructions.

In one aspect of the present invention there is provided a construction machine wherein a plurality of hydraulic pumps for operating a plurality of hydraulic actuators are activated by separate electric motors and the number of revolutions of each of the electric motors is controlled by a controller, whereby the discharge rate in each of the hydraulic pumps is controlled.

In another aspect of the present invention there is provided a construction machine comprising a plurality of hydraulic actuators, a hydraulic pump for operating the hydraulic actuators, an electric motor for activating the hydraulic pumps control valves disposed between the hydraulic pump and the hydraulic actuators to control the supply and discharge of pressure oil to and from the hydraulic actuators, operating means which are operated from the exterior and which issue operation commands to the control valves, and a controller which in accordance with operations of the operating means controls an operation stroke of each of the control valves and the number of revolutions of the electric motor.

In a further aspect of the present invention there is provided a construction machine comprising a plurality of hydraulic actuators, a plurality of hydraulic pumps which operate the hydraulic actuators separately, a plurality of electric motors which activate the hydraulic pumps separately, control valves disposed between the hydraulic pumps and the hydraulic actuators to control the supply and discharge of pressure oil to and from the hydraulic actuators, operating means which are operated from the exterior and which issue operation commands to the control valves, and a controller which in accordance with operations of the operating means controls an operation stroke of each of the control valves and the number of revolutions of each of the electric motors.

In a still further aspect of the present invention there is provided a construction machine wherein an upper rotating body is mounted pivotedly on a lower traveling body so as to be rotatable about a vertical axis thereof and a working attachment including a boom, an arm secured to a front end of the boom, and a bucket secured to a front end of the arm is mounted to the upper rotating body so that it can be raised and lowered, the construction machine comprising a boom cylinder, an arm cylinder, a bucket cylinder, the boom cylinder, the arm cylinder and the bucket cylinder being adapted to actuate the boom, the arm and the bucket respectively in a separate manner, a first pump serving as an oil pressure source for the boom cylinder, a second pump serving as an oil pressure source for both the arm cylinder and the bucket cylinder, control valves disposed between the second pump and the arm and bucket cylinders, a first electric motor for activating the first pump, and a second electric motor for activating the second pump, the boom cylinder being controlled its operating direction and speed by rotational direction and speed of the first electric motor, the arm cylinder and the bucket cylinder being controlled their operating speeds by a rotational speed of the second electric motor and by the control valves and being controlled their operating directions by the control valves.

BEST MODE FOR CARRYING OUT THE INVENTION

In the following embodiments reference will be made to a hydraulic excavator as an example of a construction machine to which the present invention is applied.

First Embodiment (See FIGS. 1 to 6)

Figure 1:
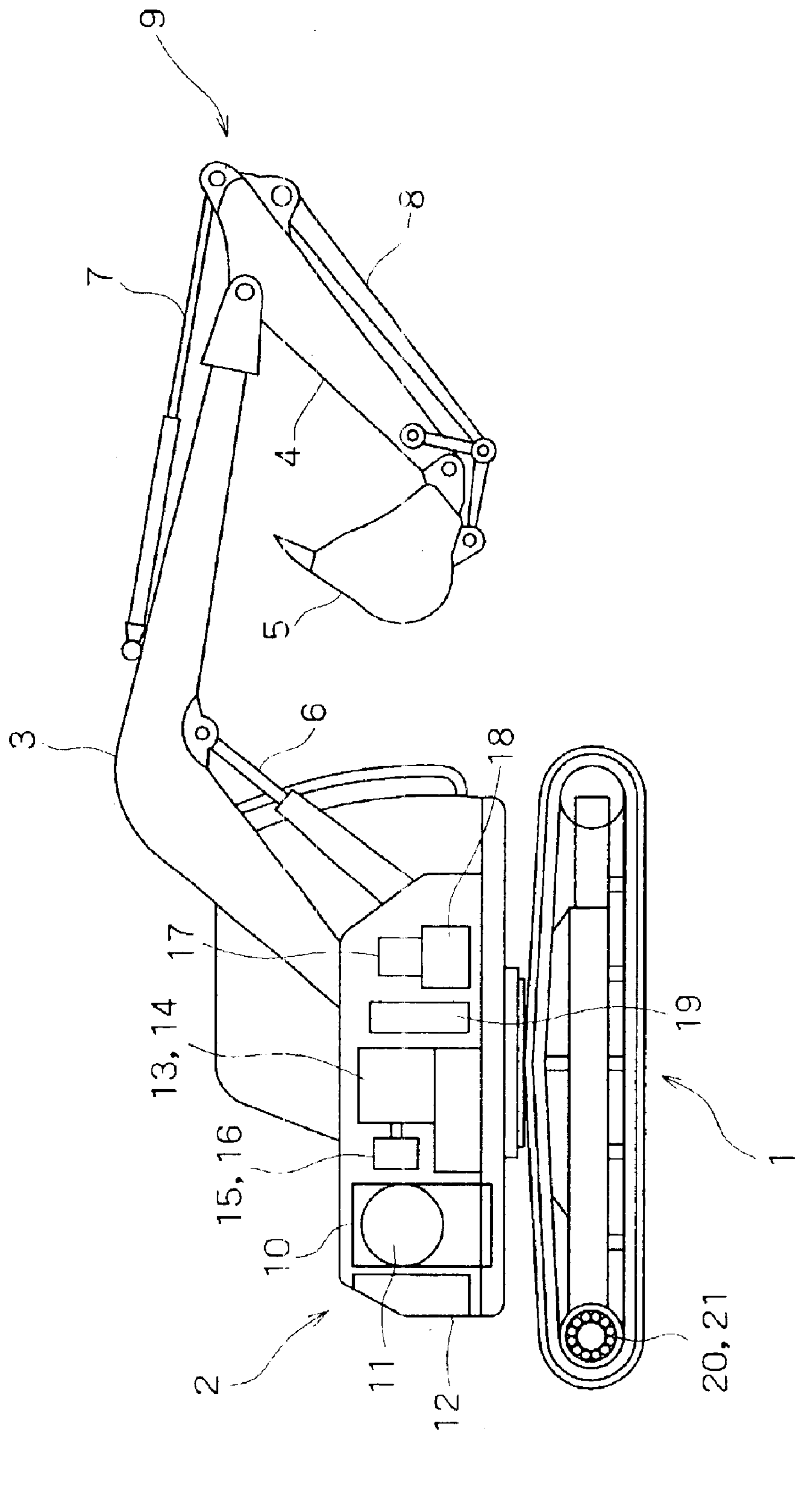
FIG. 1 is an entire side view of a hydraulic excavator according to a first embodiment of the present invention.

FIG. 1 shows the whole of a hydraulic excavator according to this first embodiment.

In the same figure, the reference numeral 1 denotes a crawler type lower traveling body, with an upper rotating body 2 being mounted rotatably on the lower traveling body 1. An excavating attachment 9 comprising a boom 3, an arm 4, a bucket 5, a boom raising/lowering cylinder 6 for raising/lowering the boom, an arm cylinder 7 for actuating the arm, and a bucket cylinder 8 for operating the bucket, is attached to a front portion of the upper rotating body 2.

In the upper rotating body 2 are installed an engine 10 as a power source, a generator 11 which is driven by the engine 10, a battery 12, two first and second electric motors 13, 14 (only one is shown; indicated at M1 and M2 in FIG. 2), and first and second hydraulic pumps 15, 16 (indicated at P1 and P2 in FIG. 2) which are activated by the electric motors 13 and 14 respectively.

Numeral 17 denotes a rotating hydraulic motor, numeral 18 denotes a reduction mechanism for rotation which decelerates the rotational force of the rotating hydraulic motor and transmits it as a rotating force to the upper rotating body 2, and numeral 19 denotes a control valve unit provided with plural control valves.

In the lower traveling body 1 are provided left and right traveling hydraulic motors (only one is shown) 20, 21 as traveling drive sources.

Figure 2:
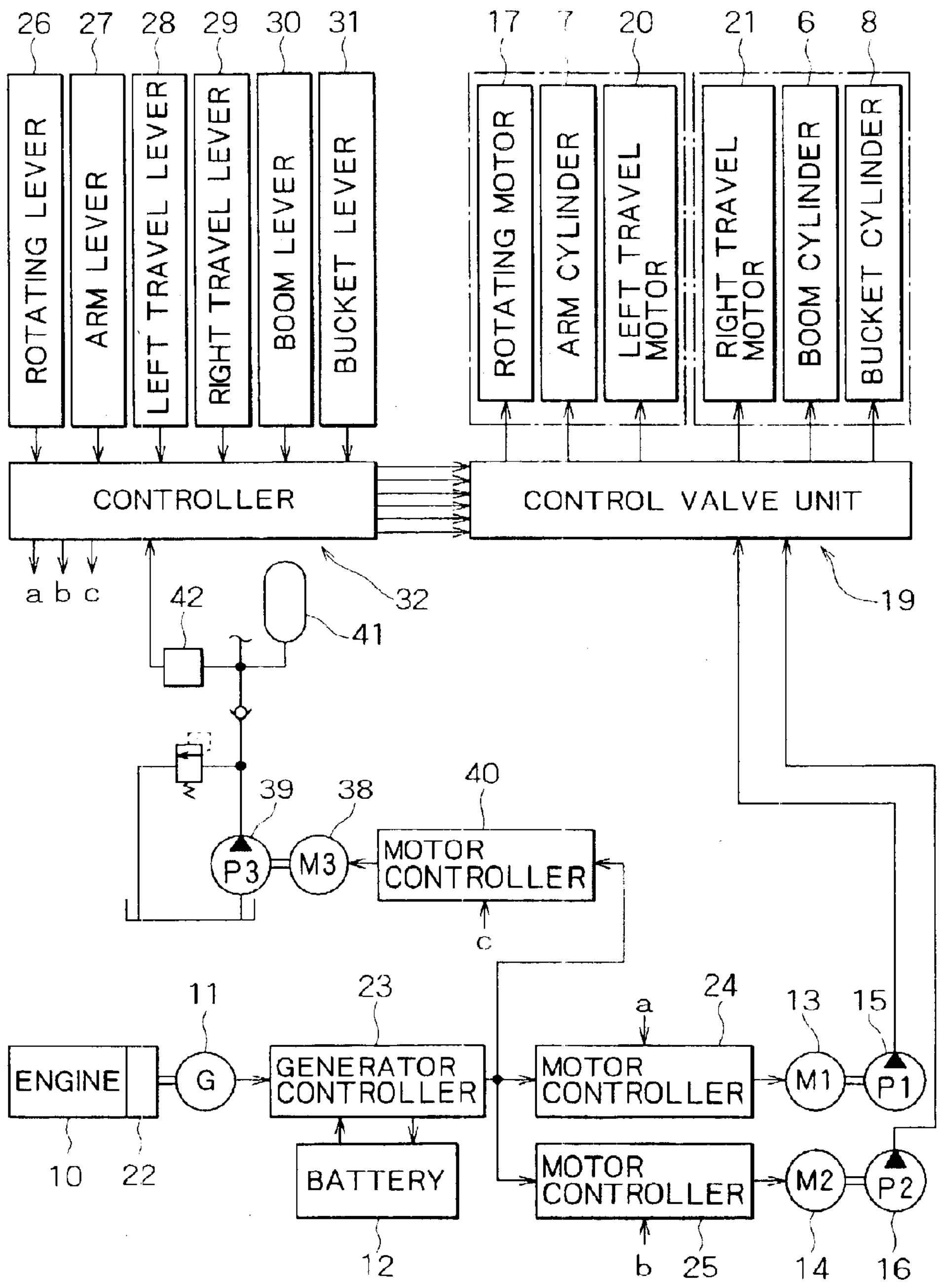
FIG. 2 illustrates the construction of a drive system and a control system both used in the first embodiment.

FIG. 2 shows the construction of a drive system and a control system in this hydraulic excavator.

The output of the engine 10 is provided to the generator 11 through a speed-up mechanism 22 and electric power generated in the generator 11 is fed to the first and second electric motors 13, 14 through a generator controller 23 and electric motor controllers 24, 25 to rotate both electric motors 13 and 14. As a result, the first and second hydraulic pumps 15, 16 are activated by the first and second electric motors 13 and 14, respectively.

By operating the generator 11 at a higher speed than the engine 10 by means of the speed-up mechanism (e.g., a planetary gear mechanism) 22 it becomes possible to attain the reduction in size of the generator 11.

Figure 3:
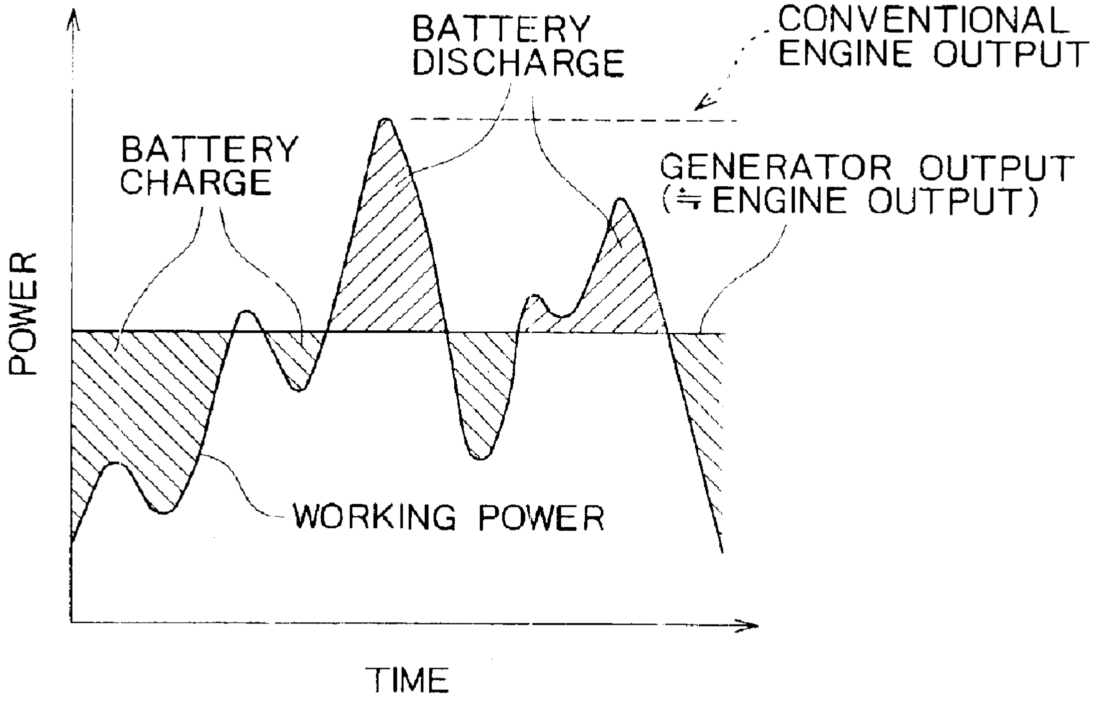
FIG. 3 illustrates a power characteristic obtained in the first embodiment.

As shown in FIG. 3, as to the electric power generated by the generator 11, a surplus portion thereof relative to the power required for the work is converted to a direct current by the generator controller 23 and is stored in the battery 12. The electric power thus stored in the battery 12 is used, as necessary, as a power supply for the electric motors.

By adopting such a construction as replenishes power by the electric power stored in the battery 12, not only the size of the engine can be reduced but also it is possible to smooth the engine load and reduce noise and exhaust gas in comparison with a conventional pure hydraulic system wherein hydraulic pumps are activated by means of an engine.

On the other hand, as operating means there are provided rotating lever 26, arm lever 27, left travel lever 28, right travel lever 29, boom lever 30, and bucket lever 31, and command signals responsive to operation quantities. (including operating directions, as is also the case in the following) of the levers 26 to 31 are outputted to a controller 32 from operation quantity/electric signal converter means (e.g., potentiometer) (not shown).

In accordance with the command signals the controller 32 outputs operation signals to control valves (indicated as a valve unit 19 in FIG. 2) which correspond to the actuators respectively, and at the same time provides number-of-revolutions command signals a and b to the first and second electric motors 13, 14 (electric motor controllers 24 and 25).

As a result, the control valves operate at strokes proportional to the operation quantities of the levers. At the same time, the electric motors 13 and 14 rotate at revolutions proportional to the operation quantities of the levers and the pumps 15 and 16 discharge oil at flow rates proportional to the electric motor revolutions.

Thus, upon operation of the levers, the control valves and the electric motors 13, 14 (pumps 15, 16) are controlled simultaneously, whereby the speed of each actuator is controlled.

The first hydraulic pump 15 is used as a pressure oil source for the rotating hydraulic motor 17, arm cylinder 7, and left traveling hydraulic motor 20, while the second hydraulic pump 16 is used as a pressure oil source for the remaining actuators (left traveling hydraulic motor 21, boom cylinder 6, bucket cylinder 8).

As both electric motors 13 and 14 there are used motors of the same volume and this is also true of both pumps 15 and 16. As in the prior art, the first hydraulic pump 15 is used also as a source of confluent oil for increasing the speed of the boom cylinder 6, and the second hydraulic pump 16 is used as a source of confluent oil for increasing the speed of the arm cylinder 7.

Figure 4:
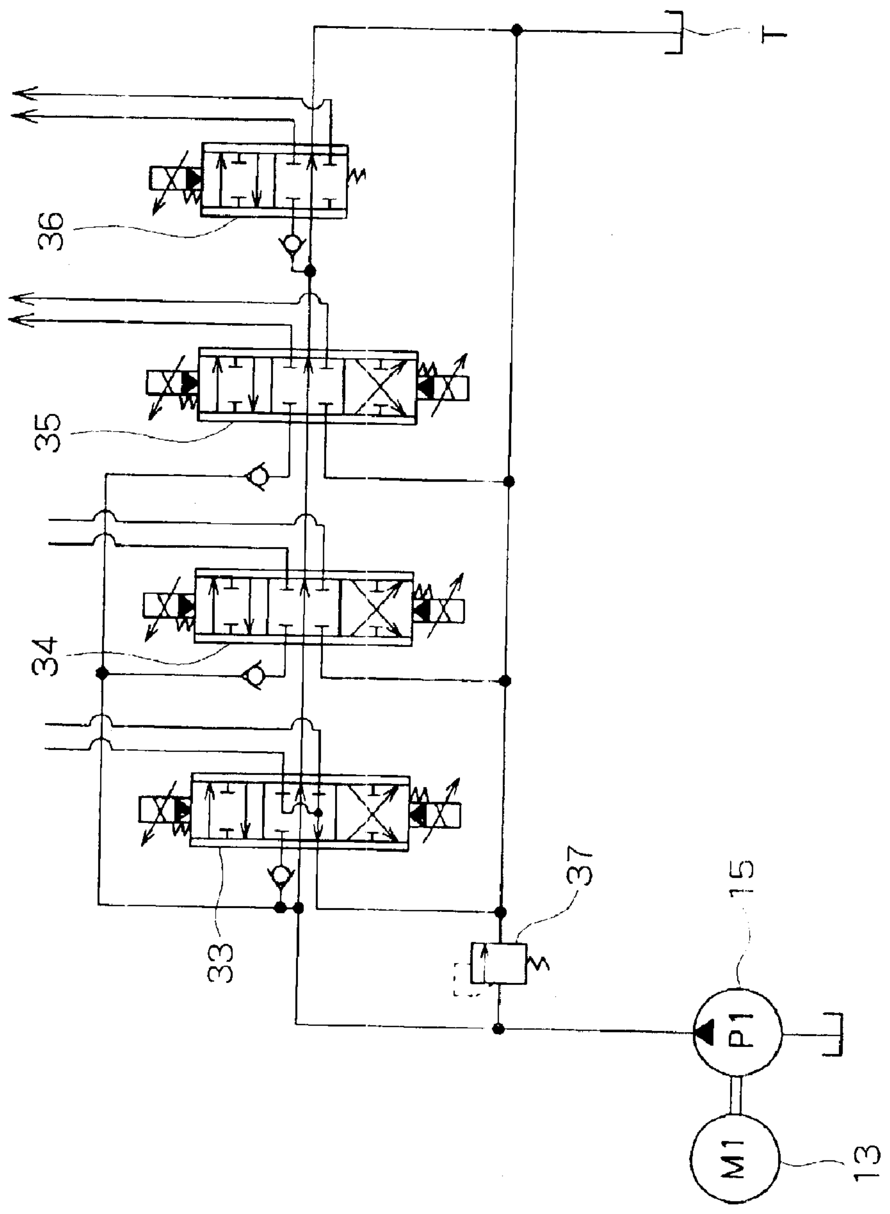
FIG. 4 illustrates a part of a hydraulic circuit in a first hydraulic pump system used in the drive system.

FIG. 4 illustrates a hydraulic circuit associated with the first hydraulic pump 15 (the first electric motor 13).

Numerals 33, 34, 35, and 36 denote control valves respectively for the left traveling motor, for the arm cylinder, for the rotating motor, and for coalescent speed-up of the boom cylinder. The control valves 33~36 operate at strokes proportional to the lever operation quantities respectively to control the operations of the actuators (rotating hydraulic motor 17, arm cylinder 7, left traveling hydraulic motor 20). Numeral 36 denotes a relief valve and T denotes a tank.

Figure 5:
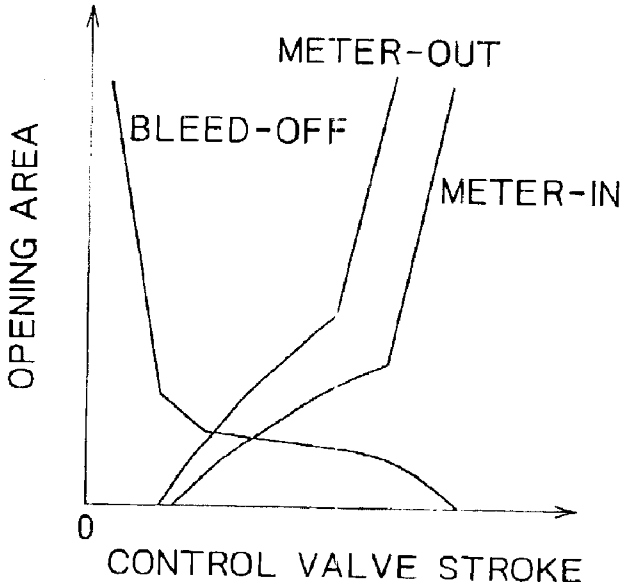
FIG. 5 illustrates an opening area characteristic of control valves used in the hydraulic circuit.
Figure 6:
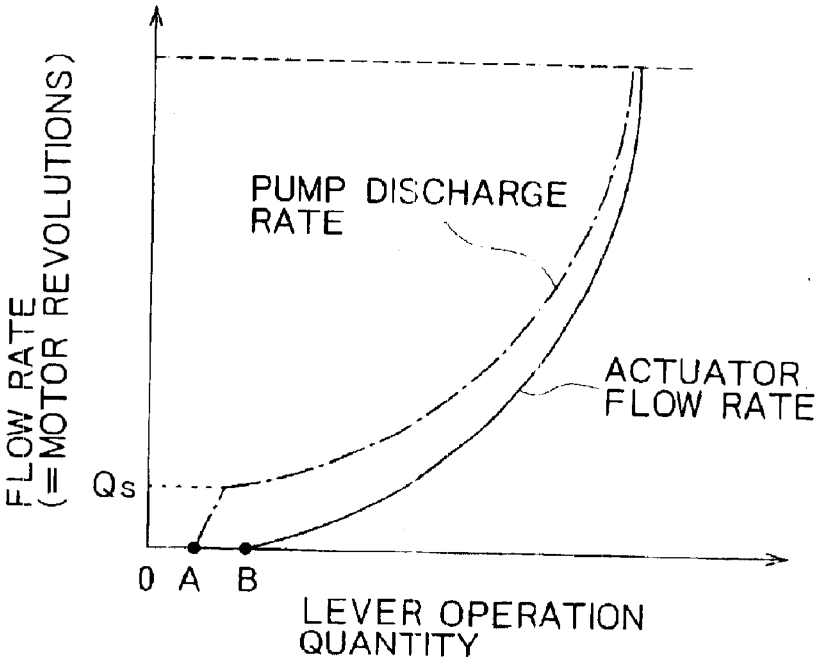
FIG. 6 illustrates a lever operation quantity/flow rate characteristic in the first embodiment.

The control valves 33~35 are each provided with a meter-in, meter-out, and bleed-off passages having such an opening area characteristic as shown in FIG. 5. Such a flow characteristic as shown in FIG. 6 is obtained by controlling the strokes of the control valves 33~35 and by controlling the electric motors 13, 14 (the pump 15, 16).

More specifically, with the levers at neutral positions (operation quantity:zero), the number of revolutions of the electric motor is zero, while at point A the number of revolutions of the electric motor rises at a steep gradient (or stepwise) and increases to a stand-by number of revolutions and the pump discharge rate becomes a stand-by flow rate Qs. At this time, the control valves 33~35 are not in stroke operation yet, so that the oil discharged from each pump is bled off.

By thus ensuring the stand-by flow rate Qs prior to the stroke operation of the control valves 33~35 there is obtained a satisfactory operability for example at the time of a composite operation.

After the lever operation quantity has passed the point A, the number of revolutions of the electric motor and the strokes of the control valves 33~35 increase in proportion to lever operation quantities (pump flow rate), and actuator flow rates are determined on the basis of the valve strokes (opening degrees), pump flow rate, and load pressures of the actuators.

Point B is a point at which the pump pressure has becomes a load pressure as a result of having throttled the pump flow rate by the bleed-off passage. From this point B oil begins to flow in the actuators.

On the other hand, by controlling the maximum value of the electric motor torque it is also possible to control the maximum discharge pressure of the hydraulic pump 15. By so doing, there accrues an advantage of energy saving because the maximum pump pressure is restricted by controlling the electric motor torque instead of the relief action made by the relief valve which has so far been adopted.

As shown in FIG. 2, separately from both first and second electric motors 13, 14 there are provided a third electric motor 38 (indicated as M3) and a third hydraulic pump 39 (indicated as P3) for actuating parking brakes used in rotation and travel (not shown) and for the supply of pilot oil pressure to the control valves.

Oil pressure from the third hydraulic pump 39 is stored in an accumulator 41 and is used. After the accumulation of pressure in the accumulator 41 is over, this state is detected by a pressure sensor 42 and the third electric motor 38 turns OFF through the controller 32. Numeral 40 denotes an electric motor controller for the third electric motor 38.

The following advantages result from such a construction.

1. Since both hydraulic pumps 15 and 16 are controlled to optimum flow rates each independently, not only the pump efficiency is high but also it is possible to avoid the waste of throttling and discarding oil with valve.
2. The control valves 33~36 and the electric motor revolutions (pump discharge rate) are controlled simultaneously by the operation of levers, and the flow rate of oil to be fed to each actuator, as well as ON/OFF and operating speed of each actuator, are controlled by such simultaneous control, so there is no waste in flow rate and hence energy saving can be attained.
3. Since plural actuators are taken charge of by a single electric motor 13, it is possible to avoid the waste of providing an electric motor for each actuator.
4. A simple operation can be achieved because both pump flow control and flow distribution to the actuators can be done by only lever operation.
5. With the levers not in operation, the control valves 33~36 become neutral and the electric motor 13 turns OFF, premising the construction that the control valves 33~36 and the electric motor 13 are controlled by lever operation, so there is no wasteful flow and there can be obtained a more outstanding energy saving effect.

The second hydraulic pump 16 (the second electric motor 14) system which actuates and controls the right traveling motor 21, boom cylinder 6 and bucket cylinder 8 is also constructed like the first hydraulic pump system and can afford the same functions and effects as in the fist hydraulic pump system.

Figure 7:
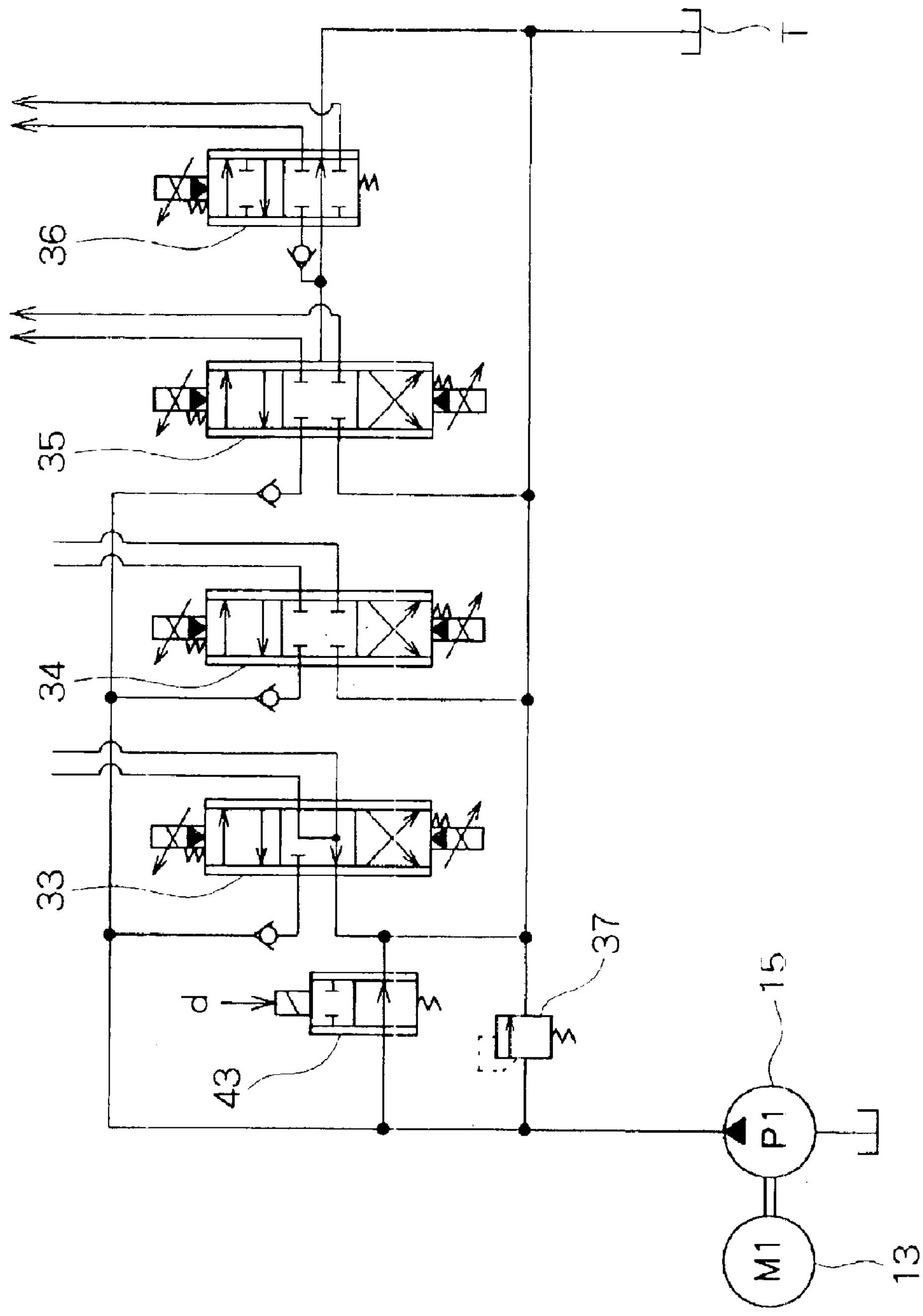
FIG. 7 is a diagram corresponding to FIG. 3, illustrating a second embodiment of the present invention.

Second Embodiment (See FIG. 7)

In the following second to fourth embodiments reference will be made to only different points from the first embodiment.

In the construction of the first embodiment bleed-off passages are provided in the control valves 33~36 respectively, while in this second embodiment bleed-off passages are not provided in the control valves 33~36, but a bleed-off valve 43 as an independent bleed-off means shared by the control valves 33~36 is provided in a pump discharge circuit. In accordance with a command signal d, which is provided from the controller 32 on the basis of lever operation, the bleed-off valve 43 operates and exhibits the same valve characteristic as in the first embodiment.

According to this construction, the control valves 33~36 become compact and it is possible to compensate for the decrease of a device mounting space caused by an increase of device types which results from the tendency to a hybrid configuration.

Figure 8:
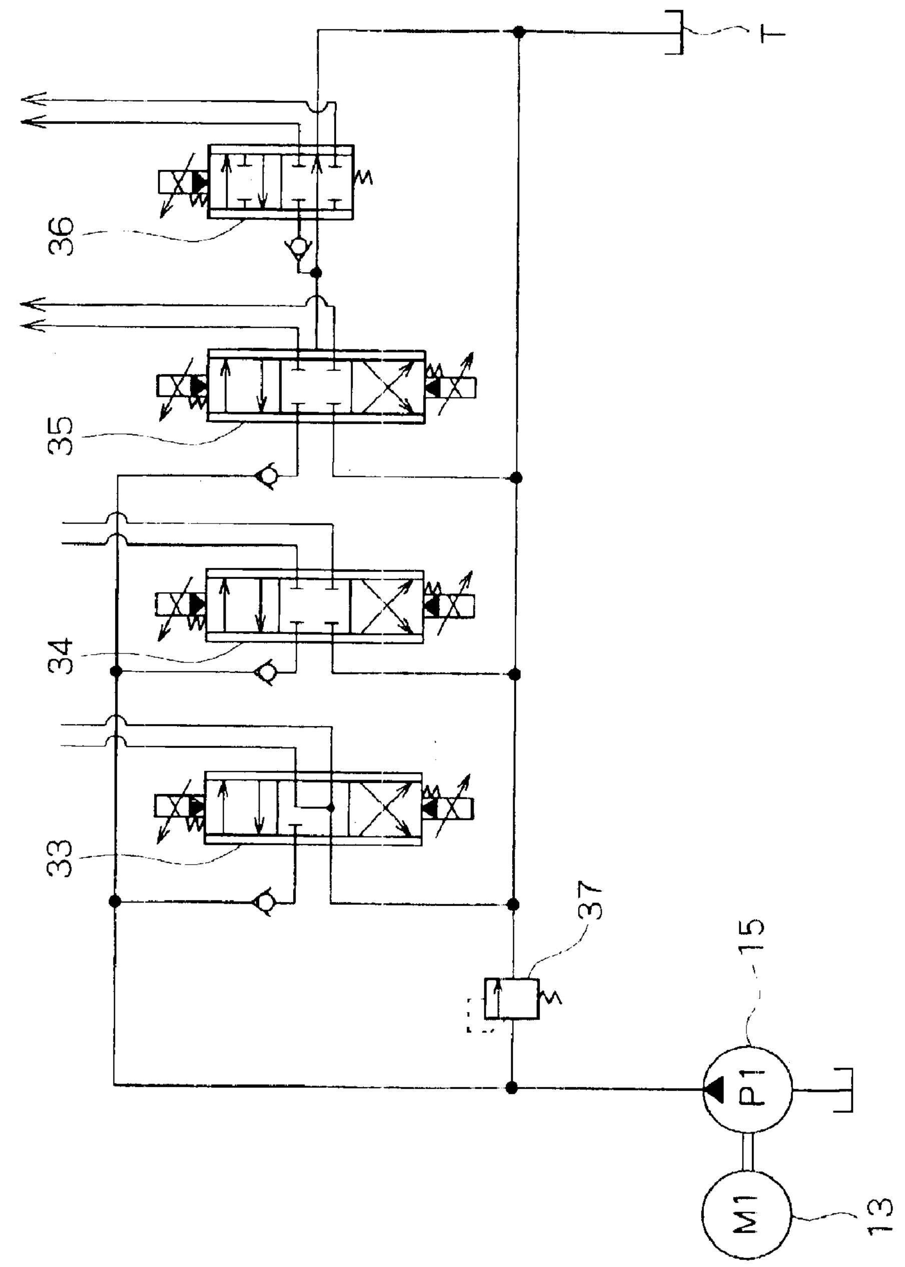
FIG. 8 is a diagram corresponding to FIG. 3, illustrating a third embodiment of the present invention.
Figure 9:
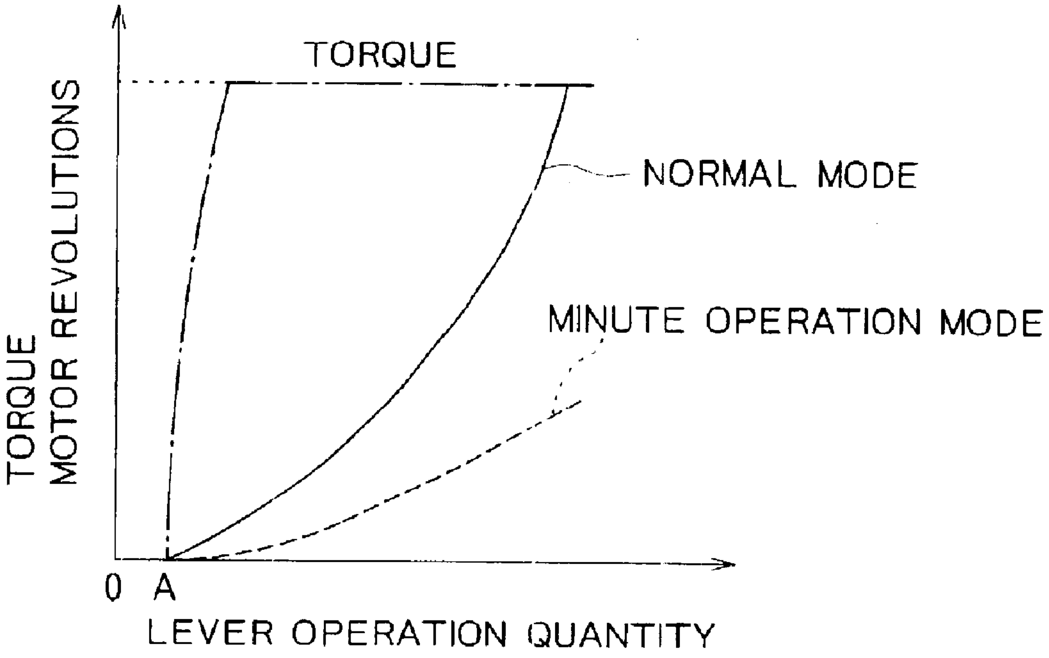
FIG. 9 illustrates a lever operation quantity/electric motor revolutions/torque characteristic in the third embodiment.

Third Embodiment (See FIGS. 8 and 9)

In this third embodiment, bleed-off means is provided neither in the control valves 33~36 nor in the exterior, and the number of revolutions of each electric motor (pump discharge rate) is controlled in accordance with lever operation quantity.

That is, as shown in FIG. 9, when the levers are in their neutral positions, the number of revolutions of the electric motor is zero, and at point A the number of revolutions of the electric motor begins to rise, then increases continuously as the lever operation quantities increase.

The strokes of the control valves are controlled in accordance with lever operation quantities, and at point A meter-in openings being to open (or are open slightly) and oil begins to flow in the actuators.

By so doing, there is no bleed-off portion and no flow that is throttled and discarded as bleed-off flow, thus resulting in a further advantage being obtained in point of energy saving.

The lever operation quantity vs. electric motor revolutions (pump discharge rate) characteristic may be switched between a normal mode and a minute operation mode which is smaller in the degree of change in electric motor revolutions than the normal mode, as shown in FIG. 9.

In a small lever operation quantity range it is preferable to make the electric motor torque smaller than its maximum value. This is for the following reason. When the actuators turn OFF, if the electric motor 13 turns OFF later than the control valves 33~36 due to a slight difference in dynamic characteristics between the two, the oil discharged from the pump comes to have nowhere to go, so the relief valve 37 operates, a high pressure is developed in the hydraulic circuit, and problems arise in point of operability and device strength. On the other hand, by keeping the electric motor torque smaller than its maximum value in a small lever operation quantity range as noted above, it is possible to suppress the generation of an abnormally high pressure in the hydraulic circuit.

Figure 10:
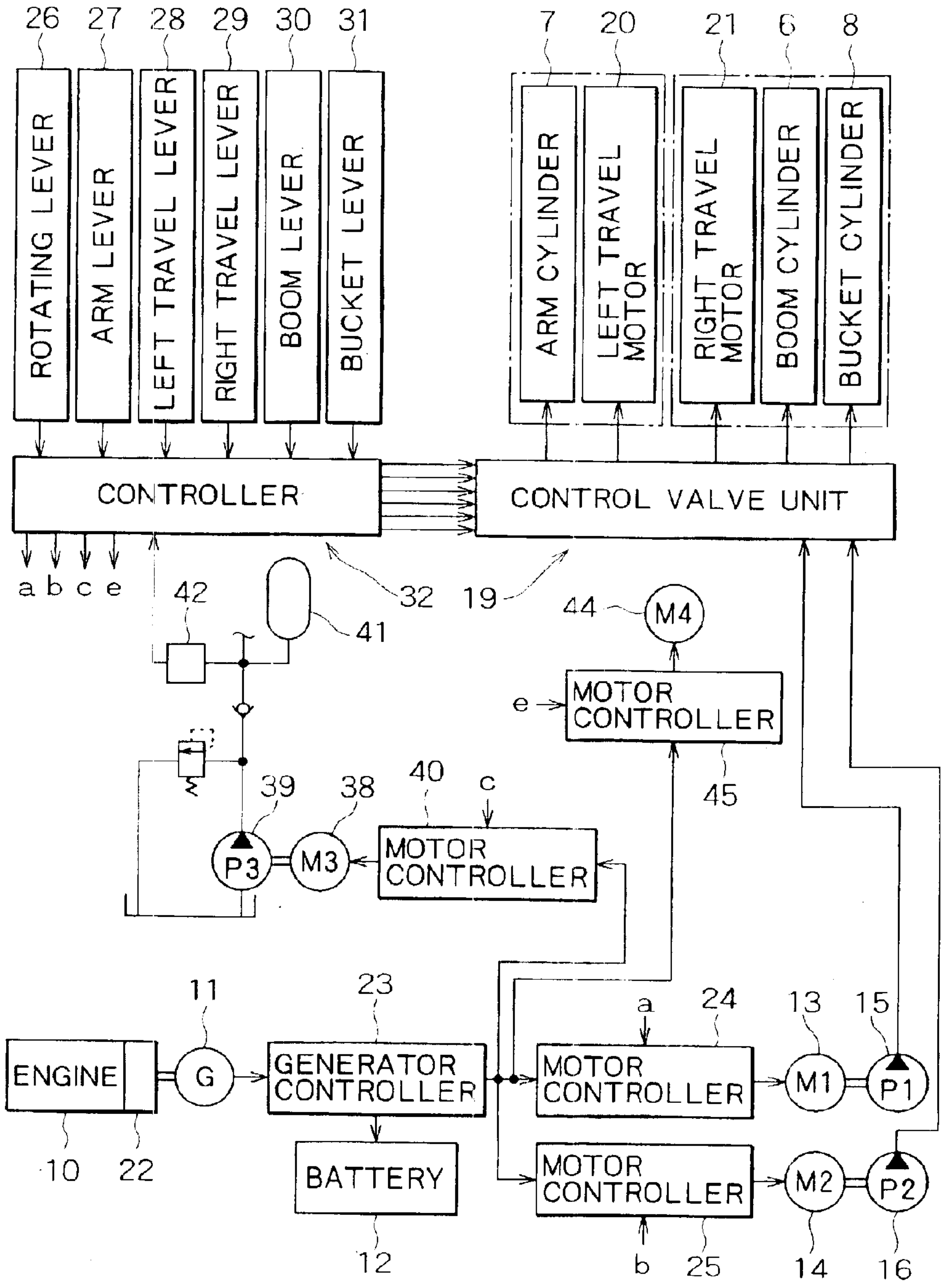
FIG. 10 is a diagram corresponding to FIG. 2, illustrating a fourth embodiment of the present invention.
Figure 11:
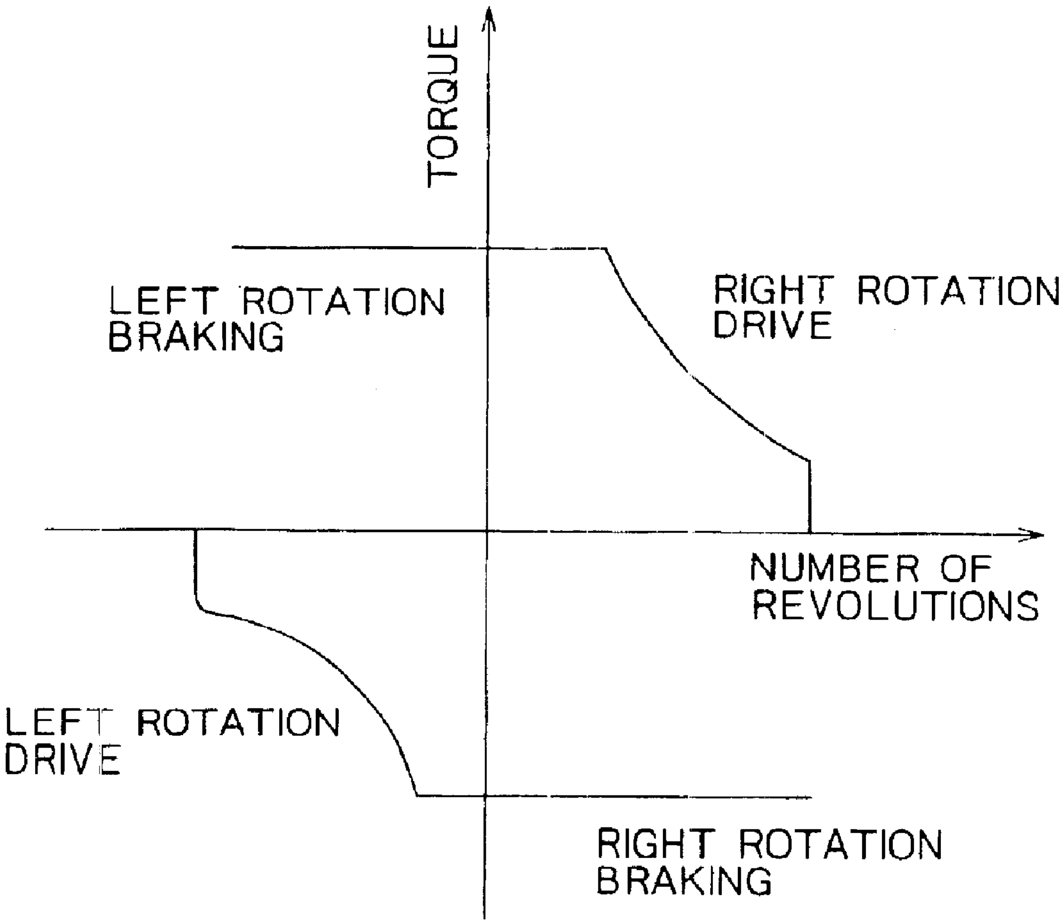
FIG. 11 illustrates a rotating electric motor revolutions/torque characteristic in the fourth embodiment.

Fourth Embodiment (See FIGS. 10 and 11)

In this fourth embodiment there is used an electric motor 44 (fourth electric motor, indicated at M4 in FIG. 10) in place of a hydraulic motor as the rotating actuator and there is adopted a construction wherein:

(a) the fourth electric motor 44 is controlled through an electric motor controller 45 in accordance with a number-of-revolutions command signal e which is provided from the controller 32 on the basis of lever operation, and (b) the electric motor 44 is allowed to operate as a generator during rotation braking.

The above control (a) may be a number-of-revolutions control or may be a torque control through current control, or even may be a composite control of both speed and torque, and is thus suitable for controlling a rotating operation of a hydraulic excavator which is large in inertia.

By the above control (b) there acts a regenerative brake and electric power obtained by the regenerative action is stored in the battery 12 or is utilized as an electric motor energizing force when another actuator is in a state of a large load.

As a result, a kinetic energy of rotation, unlike the prior art, is not relieved and discarded from a brake valve but is regenerated as electric energy, so that not only energy saving can be attained but also it is possible to prevent an increase in temperature of the hydraulic system. Besides, since the rotating operation can be controlled independently of another actuator operation, the operability in a composite operation is improved.

Although in the above embodiments there is adopted a construction in which the control valves 33~36 are controlled in accordance with electric signals provided from the controller 32, there may be adopted a construction in which electromagnetic proportion type reducing valves (remote control valves) are controlled with signals provided from the controller 32 and the control valves are controlled with secondary pressures of the remote control valves.

Although in the above embodiments reference was made to a hydraulic excavator as a suitable application example of the present invention, the invention is applicable widely to construction machines provided with plural hydraulic actuators, including cranes.

Figure 12:
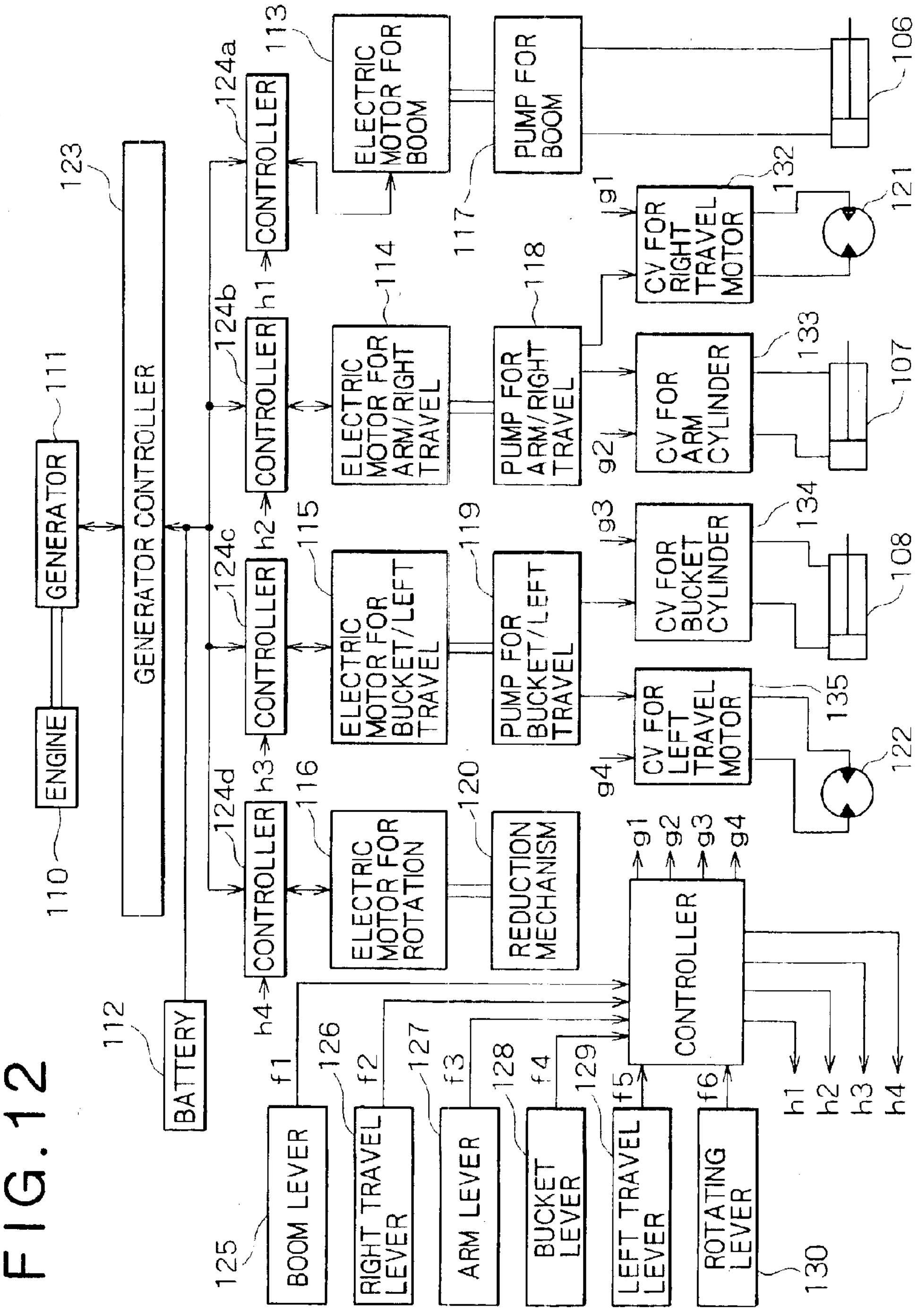
FIG. 12 illustrates the construction of a drive system and a control system for various components in a hydraulic excavator according to a fifth embodiment of the present invention.
Figure 13:
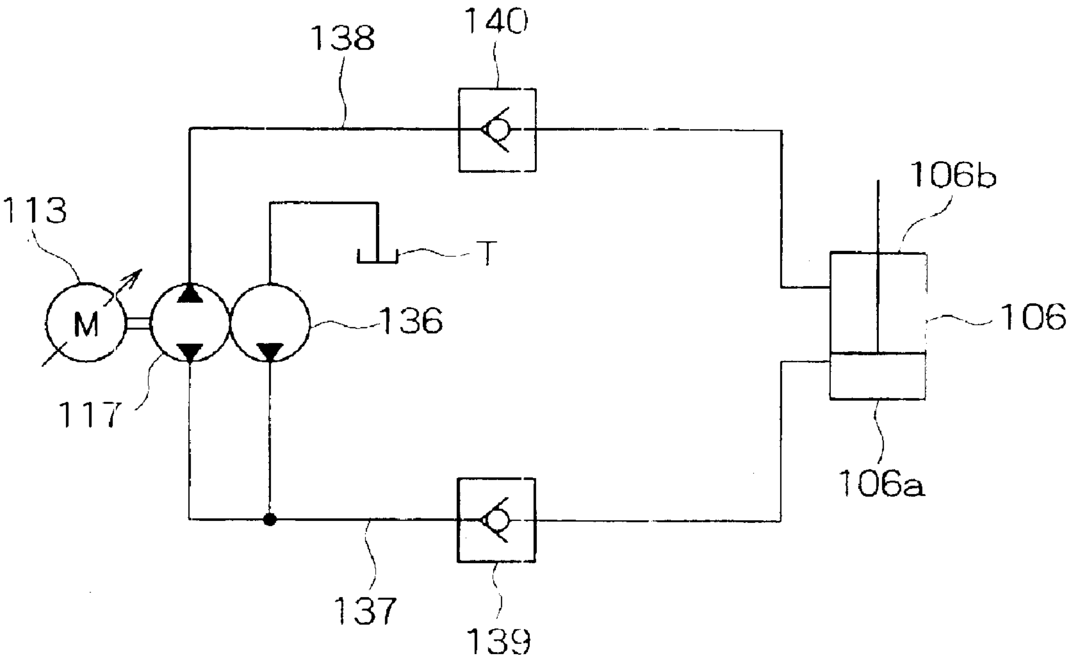
FIG. 13 is a hydraulic circuit diagram of a boom cylinder used in the fifth embodiment.
Figure 14:
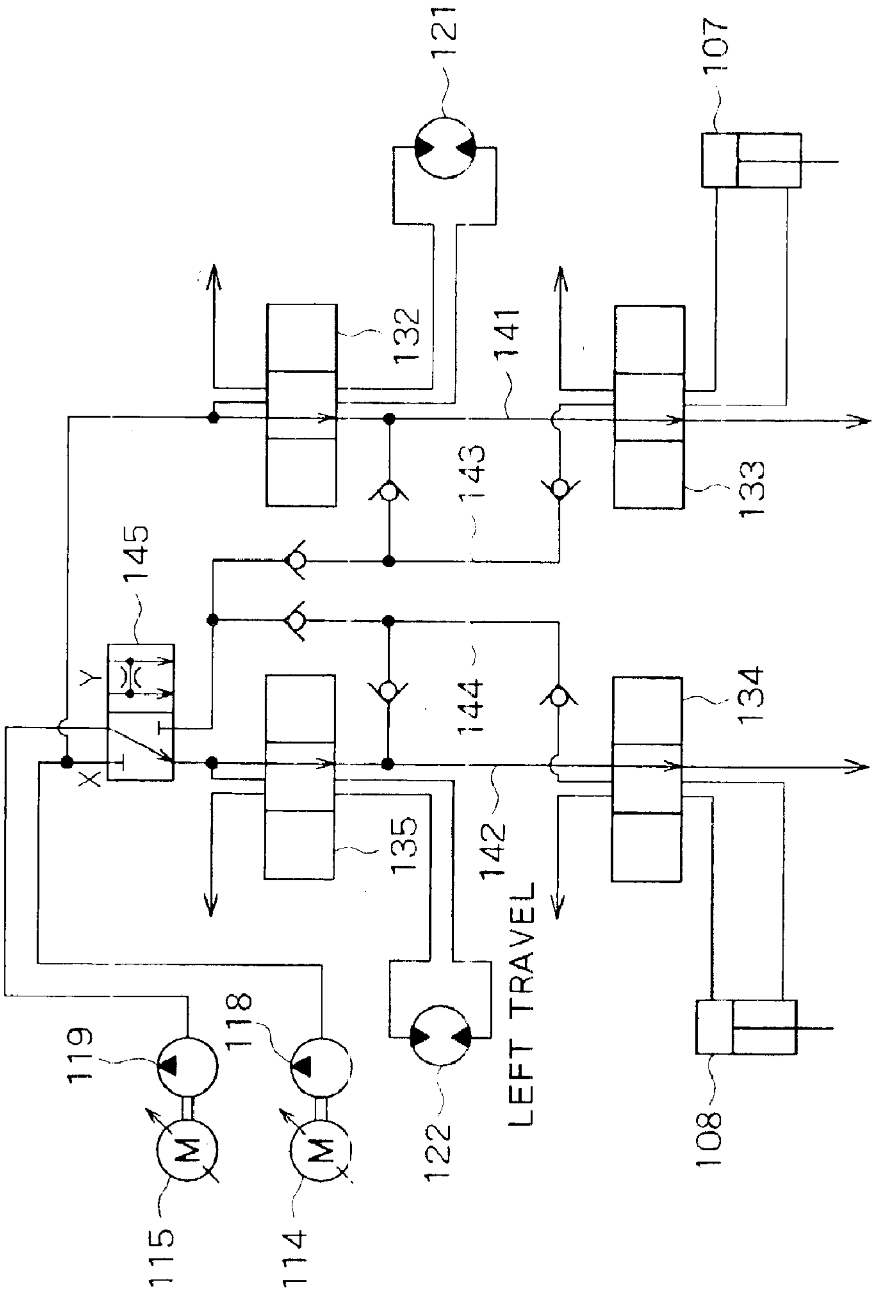
FIG. 14 is a hydraulic circuit diagram of both arm and bucket cylinders and a traveling motor in the fifth embodiment.

Fifth Embodiment (See FIGS. 12 to 14)

In this fifth embodiment, a characteristic point thereof is different from the previous first to fourth embodiments and therefore in order to make the contents thereof easier to understand in a distinguished manner from those previous embodiments, even portions which are the same as in the first to fourth embodiments are identified by entirely different reference numerals and a description will be given below on the basis of those reference numerals.

A boom cylinder 106 for raising and lowering a boom, an arm cylinder 107 for actuating an arm, and a bucket cylinder 108 for actuating a bucket are provided in an excavating attachment mounted to an upper rotating body of a hydraulic excavator.

In the upper rotating body are installed an engine 110 as a power source, a generator 111 which is driven by the engine 110, a battery 112, electric motors 113, 114, and 115 for boom, for arm/right travel, and for bucket/left travel, respectively, an electric motor 116 for rotation, and pumps 117, 118, and 119 for boom, for arm/right travel, and for bucket/left travel, respectively, the pumps 117, 118, and 119 being activated by the electric motors 113, 114, and 115, respectively, exclusive of the electric motor 116 for rotation.

Rotational force of the rotating electric motor 116 is decelerated by a reduction mechanism 120 and is transmitted directly to a rotating mechanism (rotating gear) (not shown).

In a lower traveling body are installed hydraulic motors (traveling motors) 121 and 122 as traveling drive sources for right and left travel respectively.

FIG. 12 illustrates the construction of a drive system and a control system both used in this hydraulic excavator.

As shown in the same figure, the output of the engine 110 is transmitted to the generator 111 and electric power generated in the generator 111 is fed to the electric motors 113, 114, 115, and 116 via a controller 123 for controlling the generator and further via controllers 124*a*, 124*b*, 124*c*, and 124*d* for controlling the electric motors, causing the electric motors to rotate, whereby the pumps 117, 118, 119, and 120 are activated.

As to the electric power generated in the generator 111, a surplus portion thereof relative to the power required for the work is stored in the battery 112 and the electric power thus stored in the battery is used as a motor power source as necessary.

By adopting such a construction wherein power is replenished by the electric power stored in the battery 112, it is not only possible to reduce the size of the engine but also possible to smooth the engine load and diminish noise and exhaust gas as compared with a conventional pure hydraulic system wherein hydraulic pumps are activated by means of an engine.

On the other hand, as operating means there are provided boom lever 125, right travel lever 126, arm lever 127, bucket lever 128, left travel lever 129, and rotating lever 130, and operation signals f1, f2, f3, f4, f5, and f6 responsive to lever operation quantity and directions provided from signal converter means (e.g., potentiometer) (not shown) are outputted to a controller 131.

In accordance with the operation signals the controller 131 outputs valve operation signals g1, g2, g3, and g4 to control valves 132, 133, 134, and 135 which are respectively for the right travel motor, arm cylinder, bucket cylinder, and left travel motor, and at the same time outputs number-of-revolutions command signals h1, h2, h3, and h4 to the electric motors 113~116 (controller 124, . . . ).

As a result, the control valves 132~135 operate switchingly in directions corresponding to the lever operation directions and at strokes proportional to the lever operation quantity. At the same time, the electric motors 113~116 rotate at revolutions proportional to the lever operation quantity.

The arm/right travel electric motor 114 and the bucket/left travel electric motor 115 (second electric motor) for activating the arm/right travel pump 118 and the bucket/left travel pump 119 (second pump) respectively rotate always in a fixed direction irrespective of the lever operation direction.

And, the electric motor 113 (first electric motor) for the boom which motor activates the boom pump 117 (first pump) is constructed so that its rotational direction changes according to the lever operation direction.

On the other hand, as the pump 117 for the boom there is used a two-way discharge pump in which the direction of oil discharged changes depending on the rotational direction of the electric motor 113, as shown also in FIG. 13. One port of the boom pump 117 is connected to a head-side conduit 137 of the boom cylinder 106 and the other port of the pump 117 is connected to a rod-side conduit 138 of the boom cylinder 106 in such a manner the extracting/contracting directions and operating speed of the boom cylinder 106 varies depending on the rotational direction (oil discharge direction) and the number of revolutions (oil discharge rate) of the pump 117, to constitute a boom cylinder circuit.

In FIG. 13, the numeral 136 denotes a sub-boom pump which is connected in tandem to the boom pump 117. One port of the sub-boom pump 136 is connected to the head-side conduit 137 of the boom cylinder 106 and the other port thereof is connected to a tank T.

Between head- and rod-side oil chambers 106*a*, 106*b* of the boom cylinder 106 there is a difference in sectional area corresponding to a piston rod (the rod-side oil chamber 106*b* is smaller than the head-side oil chamber 106*a*), so that with expansion and contraction of the cylinder 106 there arises a difference in flow rate between the head side and the rod side.

But in this boom cylinder circuit, when the cylinder extends, the pressure oil discharged from the sub-boom pump 136 joins the pressure oil discharged from the boom pump 117 and the joined flow is fed to the head-side oil chamber 106*a*, whereby the aforesaid flow rate difference is eliminated.

Numerals 139 and 140 denote stop holding valves such as pilot check valves disposed in both-side conduits 137 and 138 (a description on a pilot circuit will here be omitted).

On the other hand, as the other pumps 118 and 119 there are used one-way discharge pumps having a fixed discharge direction. As to the actuators (right travel motor 121, arm cylinder 107, bucket cylinder 108, left travel motor 122) which are operated by the pumps 118 and 119, their circuits are constructed so that their operating speeds change depending on the revolutions of the motors 114 and 115 and the degrees of opening of the control valves 132, 133, 134, and 135 and so that their operating directions change depending on switching directions of the control valves 132~135.

FIG. 14 illustrates a concrete example of an actuator circuit other than this boom cylinder circuit.

Basically in this circuit, as shown in FIG. 14, the right travel motor 121 and the arm cylinder 107 both located on the right-hand side in the figure are actuated with oil discharged from the arm/right travel pump 118, while the left travel motor 122 and the bucket cylinder 108 both located on the left-hand side in the figure are actuated with oil discharged from the bucket/left travel pump 119.

In the right-hand arm system and left-hand bucket system in the figure, the traveling control valves 132, 135 and the arm and bucket control valves 133, 134 are connected in tandem and bypass lines 141 and 142 are provided through respective bypass passages. Further, oil feed lines 143 and 144 are connected respectively to downstream sides of the traveling control valves 132 and 135 in the bypass lines 141 and 142.

A straight travel valve 145 is disposed between both pumps 118, 119 and both traveling control valves 132, 135. For example, when a composite operation comprising arm pushing and pulling operations is performed during travel, the straight travel valve 145 switches from a normal position X which is illustrated in the figure to a straight travel position Y. As a result, the oil discharged from the bucket/left travel pump 119 flows toward both arm and bucket cylinders 107, 108 through oil feed lines 143 and 144, while the oil from the arm/right travel pump 118 flows to both travel motors 121 and 122 in parallel through both traveling control valves 132 and 135, so that a straight travel performance is ensured.

On the other hand, as to the rotating motion of the upper rotating body, the rotating direction is controlled by the rotational direction of the rotating electric motor 116 and the rotating speed is controlled by the number of revolutions of the electric motor 116. Therefore, hydraulic equipment is not necessary at all for the rotating system; besides, the energy transfer efficiency is improved and an inertia force developed at the time of deceleration of rotation can be recovered as electric power in the battery 112 via the controller 124 and the generator controller 123.

As described above, this hydraulic excavator adopts the following construction.

(a) As to the boom cylinder 106, its extending and contracting directions are controlled by the rotational direction of the electric motor 113 for the boom (boom pump 117) and its operating speed is controlled by the number of revolutions of the electric motor 113 (boom pump 117).

(b) As to the right travel motor 121, arm cylinder 107, bucket cylinder 108, and left travel motor 122, their operating directions are controlled by the operating directions of the control valves 132, 133, 134, and 135 and their operating speeds are controlled by both degrees of opening of the control valves 132~135 and revolutions of the electric motors 114, 115, and 116.

According to this construction:

1. the boom cylinder 106 whose pressure is relatively low during excavation, as well as the bucket cylinder 108 and the arm cylinder 107 whose pressures become high, are actuated by separate pumps 117, 118, 119, so in a composite operation of these cylinders, there does not arise such a pressure loss as a high pressure of pump discharge oil being lowered and the lowered pressure oil being fed to the boom cylinder 106, thus contributing to the saving of energy.

Besides, since the arm cylinder 7 and the bucket cylinder 8 are also actuated by separate pumps 118 and 119, a pressure interference between the two becomes extinct, whereby energy saving is attained to a greater extent.

2. The boom cylinder 106 on which there acts a large gravity based on the own weight of the attachment, unlike the other actuators, is connected to the pump 117 directly without a control valve, so that the position energy of the attachment at the time of lowering of the boom can be recovered as a regenerated electric power in the battery 112 through the pump 117, electric motor 113, controller 124 and generator controller 123.
3. As to the arm cylinder 107 and bucket cylinder 108, since their operating directions are controlled by the control valves 133 and 134, respectively, it is possible to ensure a high response characteristic in such minute motion requiring works as mud removing work and earth/sand scattering work.
4. Since the arm/right travel pump 118 and the bucket/left travel pump 119 are activated by separate electric motors 114 and 115, it is possible to operate the arm cylinder 107 and the bucket cylinder 108 in a completely independent manner. Consequently, not only the operability in a composite operation is improved, but also there no longer is any energy loss because the speed control can be done independently.

Modification of Fifth Embodiment (1) There may be adopted a construction wherein a control valve for arm confluence is connected downstream of the bucket cylinder control valve 134 through a tandem circuit to increase the flow rate in the arm cylinder 107 when the bucket cylinder 108 is not in use, thereby increasing the speed. With the tandem circuit, upon switching of the bucket cylinder control valve 134, oil does not flow in the control valve for arm confluence and both bucket cylinder 108 and arm cylinder 107 become employable substantially independently.

There also may be adopted a construction wherein the control valve for arm confluence is connected to the bucket cylinder control valve 134 through a parallel circuit and a switching signal for the arm confluence control valve is attenuated with an operation signal from the bucket cylinder control valve, whereby the same action as the above can be effected.

(2) There may be adopted a construction wherein the arm cylinder 107 and the bucket cylinder 108 are actuated by a single pump.

(3) There may be adopted a construction wherein as drive means for rotation, a pump is activated by an electric motor to rotate a hydraulic motor for rotation.

(4) Although in the fifth embodiment the generator 111 which is driven by the engine 110 and the battery 112 are used as a power supply, only the batter may be used as a power supply. By so doing, the problems of engine noise and high fuel consumption can be solved because the engine 110 becomes unnecessary. Besides, as described above, since the entire construction of the excavator is an energy-saving construction, the life of the battery is long and a continuously employable time after a single charge becomes longer.

(5) Instead of outputting electric signals from the operating levers, there may be used hydraulic pressure remote controlled valves and pressures therefrom may be detected and converted to electric signals by means of sensors, and can also use together the operating levers and hydraulic pressure remote controlled valves of the electric outputting.

INDUSTRIAL APPLICABILITY

According to the present invention, as set forth above, plural hydraulic pumps are activated by separate electric motors and the electric motors are controlled in the number of revolutions each independently by control means to control the discharge rate of each hydraulic pump. Therefore, not only the pump efficiency is high but also it is possible to prevent the waste of oil being throttled and discarded with a valve.

According to the present invention, moreover, electric motors are controlled in the number of revolutions (pump discharge rate) simultaneously by operation of operating means which operate control valves, and the flow rate of oil to be fed to each actuator, i.e., ON/OFF and operating speed of each actuator, is controlled by two controls, one being controlling each control valve and the other controlling the pump discharge rate. Thus, there is no waste in the flow rate, leading to energy saving, and plural actuators can be taken charge of by a single electric motor, thus eliminating the waste of providing an electric motor for each actuator.

Further, the operation is simplified because both pump flow control and flow distribution to actuators can be done by only the operation of operating means.

On the other hand, according to the present invention, the boom cylinder whose pressure is relatively low during excavation, as well as the arm cylinder and the bucket cylinder whose pressures become high, are actuated by separate pumps, so in a composite operation of these cylinders, there no longer is such a pressure loss as a high pressure of pump discharge oil being lowered and the lowered pressure oil being fed to the boom cylinder, thus leading to the saving of energy.

Particularly, by adopting a construction wherein both arm cylinder and bucket cylinder are also actuated by separate pumps, a pressure interference between the two is eliminated, thus making a greater contribution to the saving of energy.

Further, since the boom cylinder on which there acts a large gravity based on the own weight of the attachment is connected to a pump directly without a control valve, a position energy of the attachment developed at the time of lowering the boom can be regenerated as power through the pump and electric motor.

On the other hand, as to the arm cylinder and the bucket cylinder, since their operating directions are controlled by control valves, a high response characteristic can be ensured in works which require minute motions such as a mud removing work and an earth/sand scattering work.

I claim:

1. A hybrid construction machine comprising:

an engine;

a generator connected to be driven by said engine;

a battery connected to store surplus electric power from said generator; and a plurality of hydraulic pumps for operating a plurality of hydraulic actuators and actuated by separate electric motors connected to receive electric power from said generator, wherein a number of revolutions of each of said electric motors is controlled by a controller, whereby a discharge rate in each of said hydraulic pumps is controlled.

2. A hybrid construction machine comprising:

an engine;

a generator connected to be driven by said engine;

a battery connected to store surplus electric power from said generator;

hydraulic actuators;

a hydraulic pump adapted to operate said hydraulic actuators;

an electric motor connected to receive electric power from said generator and adapted to actuate said hydraulic pump;

control valves disposed between said hydraulic pump and said hydraulic actuators to control a supply and discharge of pressure oil to and from said hydraulic actuators;

operating means adapted to issue operation commands to said control valves by an exterior operation; and a controller adapted to control an operation stroke of each of said control valves and the number of revolutions of said electric motor in accordance with operation of said operating means.

3. A hybrid construction machine comprising:

an engine;

a generator connected to be driven by said engine;

a battery connected to store surplus electric power from said generator;

hydraulic actuators;

hydraulic pumps adapted to operate said hydraulic actuators separately;

electric motors connected to receive electric power from said generator and adapted to actuate said hydraulic pumps separately;

control valves disposed between said hydraulic pumps and said hydraulic actuators to control a supply and discharge of pressure oil to and from the hydraulic actuators; and operating means adapted to issue operation commands to said control values by an exterior operation; and a controller adapted to control an operation stroke of each of said control valves and the number of revolutions of each of said electric motors in accordance with operation of said operating means.

4. The hybrid construction machine according to one of claim 2 or 3, wherein, when said operating means has a value of zero in terms of operation quantity, said control valves are in neutral position, each of said electric motors being in a stopped position and, with an increase in operation quantity of said operating means, the operation stroke of each of said control valves and the number of revolutions of each said electric motor increase.

5. The hybrid construction machine according to claim 4, wherein when said operating means is operated at a certain quantity from a state of zero, the number of revolutions of each said electric motors increases from zero to a stand-by number of revolutions to ensure a stand-by flow rate.

6. The hybrid construction machine according to one of claim 2 or 3, wherein in a small operation quantity range of said operating means a motor torque is made smaller than a maximum value thereof.

7. The hybrid construction machine according to one of claim 2 or 3, wherein a motor revolutions characteristic relative to operation quantity of said operating means can be switched between a normal mode and a minute operation mode which is smaller in the degree of change of motor revolutions than in said normal mode.

8. The hybrid construction machine according to one of claim 2 or 3, wherein bleed-off means adapted to bleed off pump discharge oil is provided separately from said control valves and in a shared state shared by the control valves.

9. The hybrid construction machine according to one of claim 2 or 3, wherein the flow rate is controlled by only a hydraulic pump discharge rate control based on an electric motor revolutions control to male bleed-off flow rate zero.

10. The hybrid construction machine according to one of claim 2 or 3, wherein a maximum discharge pressure of said hydraulic pumps is limited by controlling a maximum value of the motor torque.

11. The hybrid construction machine according to one of claim 2 or 3, wherein a body of the construction machine comprises a lower traveling body and an upper rotating body mounted rotatably on said lower traveling body, and a rotating electric motor for rotating said upper rotating body is used as an actuator other than said hydraulic actuators.

12. The hybrid construction machine according to one of claim 2 or 3, wherein a body of the construction machine comprises a lower traveling body and an upper rotating body mounted rotatably on said lower traveling body, and an excavating attachment is provided in said upper rotating body.

13. A hybrid construction machine wherein an upper rotating body is mounted on a lower traveling body so as to be rotatable about a vertical axis thereof and a working attachment including a boom, an arm secured to a front end of said boom, and a bucket secured to a front end of said arm, is mounted to said upper rotating body so that it can be raised and lowered, said construction machine comprising:

an engine;

a generator connected to be driven by said engine;

a battery connected to store surplus electric power from said generator;

a boom cylinder, an arm cylinder, a bucket cylinder, said boom cylinder, said arm cylinder and said bucket cylinder being adapted to actuate said boom, said arm and said bucket respectively in a separate manner, a first pump serving as an oil pressure source for said boom cylinder, a second pump serving as an oil pressure source for both said arm cylinder and said bucket cylinder, control valves disposed between said second pump and said arm and bucket cylinders, a first electric motor for activating said first pump, and a second electric motor for activating said second pump, said first and second electric motors being connected to receive electric power from said generator, said boom cylinder being controlled in its operating direction and speed by rotational direction and speed of said first electric motor, said arm cylinder and said bucket cylinder being controlled in their operating speeds by a rotational speed of said second electric motor and by said control valves and being controlled their operating directions by said control valves.

14. The hybrid construction machine according to claim 13, wherein an arm pump for actuating said arm cylinder and a bucket pump for actuating said bucket cylinder are provided separately as said second pump.

15. The hybrid construction machine according to claim 14, wherein said second electric motor comprises an arm electric motor for activating said arm pump and a bucket electric motor for activating said bucket pump.

16. The hybrid construction machine according to claim 14 or claim 15, wherein said lower traveling body comprises right and left crawlers, wherein a hydraulic pressure motor is used as a drive source which are driven by separate hydraulic travel motors, one of said travel motors being connected to said arm pump and the other travel motor connected to said bucket pump respectively through control valves which control rotational directions of the motors.

17. The hybrid construction machine according to claim 13, wherein an electric motor is used as a drive source for said upper rotating body and a rotational force of said electric motor is transmitted to a rotating mechanism after being decelerated by a reduction mechanism.

18. The hybrid construction machine according to one of claims 1, 2, 3 or 13, wherein said battery is connected to store regenerated electric power from said electric motors.

* * * * *